United States Patent [19]

Connally et al.

[11] Patent Number: 4,790,001

[45] Date of Patent: Dec. 6, 1988

[54] METHODS OF COMMUNICATING OVER METALLIC CONDUCTORS HAVING MULTIPLE GROUNDS

[75] Inventors: Douglas R. Connally; George G. Galloway, Jr., both of Mineral Wells, Tex.

[73] Assignee: Industrial Technology, Inc., Mineral Wells, Tex.

[21] Appl. No.: 77,171

[22] Filed: Jul. 24, 1987

Related U.S. Application Data

[63] Continuation of Ser. No. 942,002, Dec. 15, 1986, which is a continuation of Ser. No. 691,490, Jan. 14, 1985.

[51] Int. Cl.⁴ .............................................. H01M 11/00
[52] U.S. Cl. ........................................ 379/66; 379/64
[58] Field of Search ................................... 379/66, 64

[56] References Cited

U.S. PATENT DOCUMENTS

| | | | |
|---|---|---|---|
| 3,129,394 | 4/1964 | Long | 379/66 |
| 4,473,817 | 9/1984 | Perkins | 379/64 |
| 4,479,033 | 10/1984 | Brown | 379/66 |
| 4,504,705 | 3/1985 | Pilloud | 379/66 |

*Primary Examiner*—Robert Lev
*Attorney, Agent, or Firm*—James C. Fails; Arthur F. Zobal

[57] ABSTRACT

The invention provides methods of communication between two locations along a cable where the only metallic conductor available is grounded at numerous points along its length, which methods utilize a "distributed earth referenced carrier system" and wherein a first transceiver is electrically coupled to the metallic conductor at a first location and a second transceiver is electrically coupled to the metallic conductor at a second location.

9 Claims, 2 Drawing Sheets

METHODS OF COMMUNICATING OVER METALLIC CONDUCTORS HAVING MULTIPLE GROUNDS

CROSS-REFERENCE TO RELATED APPLICATIONS

This application is a continuation of application Ser. No. 06/942,002, filed Dec. 15, 1986, which was a continuation of original application Ser. No. 06/691,490 filed by Douglas R. Connally et al on Jan. 14, 1985 for "METHODS OF COMMUNICATING OVER METALLIC CONDUCTORS HAVING MULTIPLE GROUNDS", now abandoned.

FIELD OF INVENTION

The invention relates generally to the field of telephony and more particularly to effective methods of communicating over metallic conductors having multiple grounds.

BACKGROUND OF THE INVENTION

It is a basic need for workmen working with telephone or other communications cables to be able to communicate with other workmen who are working with the same cable. In conducting certain types of tests in which a sequence of steps is required, constant communication between workmen is a must. Also when cables are being placed, communication between workmen is a necessity. Such communication is not a serious problem so long as access to a cable with metallic conductors is available. If metallic conductors are available, a workman merely connects a headset and a battery to an unused cable pair on one end, and is able to talk to a workman on the other end who has only a headset.

However, a serious problem does arise when access to metallic conductors is not available. This commonly occurs when the cable is being placed and has not yet been opened by the workmen. Another case is that in which non-metallic cables are used, such as fiber optic cables. In these two cases, the workman has had no choice but to open a metallic cable in order to establish a communications link, or to use a more exotic communications link such as radio or fiber optic links. Radio works fairly well but is limited in range, particularly when one or both of the workmen are in underground locations or inside buildings. On fiber optic cables a fiber optic talk set can be used, but the equipment required is expensive and will only work if the cable is open and a termination point is available.

It is thus apparent that there is a need tor a new method of communicating over unopened metallic cables and fiber optic cables, which method involves easy set up; is inexpensive; is reliable up to a distance of several miles and does not require either the opening of a cable or a termination point. It is accordingly the objective of this invention to provide such a new method.

DESCRIPTION OF PREFERRED EMBODIMENTS

The present invention derives from the realization that it is possible in a carrier communication system to utilize for a transmission line the earth as a reference conductor and a single metallic conductor having multiple grounds (such as a cable sheath) as the other conductor. A carrier communication system which utilizes such a transmission line is referred to herein as a "distributed earth referenced carrier system". The earth is believed to be a combination of conductor and dielectric such that a single metallic conductor having multiple grounds and the earth, or "ground" can act like a transmission line with the single metallic conductor as a first conductor and the earth considered as a second conductor spaced a distance from the first conductor with dielectric in between so that there is effective impedance between the first and second conductors.

Carrier communication systems have of course been used for many years in applications where two conductors have been available. For example, electric utility power lines are ideal for carrier communication systems because they are not grounded and multiple conductors are available for signal transmission.

When there is presented the problem of how to carry out communication between two locations along a cable, with the only metallic conductor available being the cable sheath which is grounded at numerous points along its length, a solution involving a carrier system would appear to be out of the question. Nevertheless, and surprisingly, it turns out that a carrier system can be used effectively in such context, and hence the "distributed earth referenced carrier system" of the present invention.

Although the present invention can be utilized in any application in which there is a need for communication between locations along a cable where the only metallic conductor available is grounded at various points along its length, the most common application will involve telephone cables.

Figure 1:
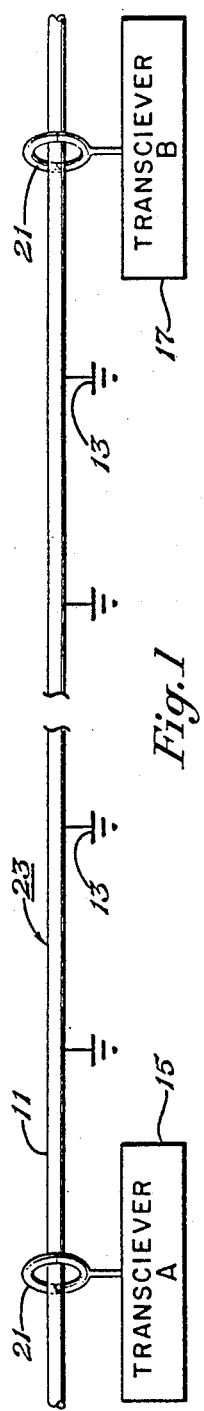
FIG. 1 is a schematic diagram illustrating a communication method in accordance with a preferred embodiment of the invention and wherein transceivers are electrically coupled to a metallic conductor having frequent grounds, using magnetic coupling.
Figure 2:
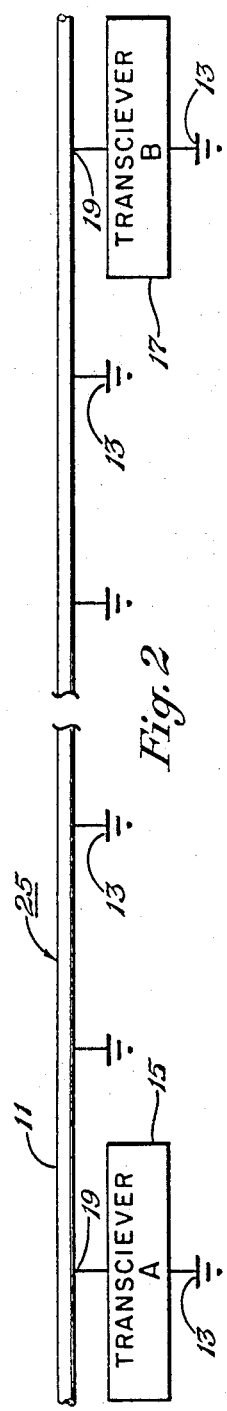
FIG. 2 is a schematic diagram illustrating a communication method in accordance with another embodiment of the invention wherein transceivers are electrically coupled to a metallic conductor having frequent grounds, using conductive coupling.
Figure 3:
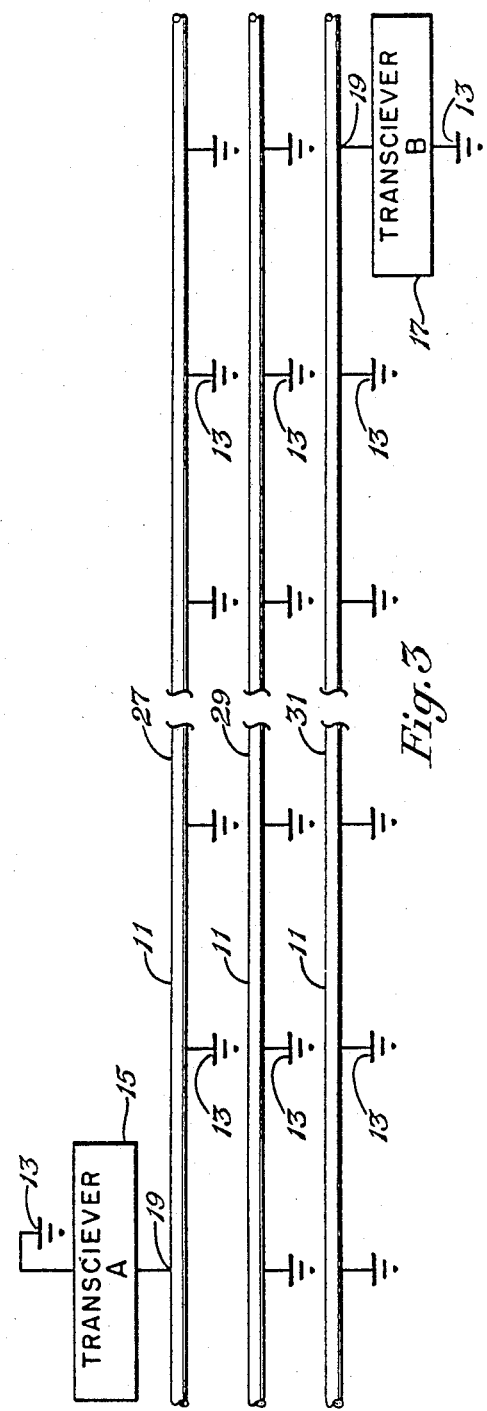
FIG. 3 is a schematic diagram illustrating a communication method in accordance with another embodiment of the invention wherein a plurality of metallic conductors having frequent grounds are disposed in close proximity to each other and transceivers are electrically coupled to different ones of said metallic conductors.

The cables shown in FIGS. 1, 2 and 3 of the drawings may be assumed to be telephone cables 23, 25, 27, 29, 31, each of which has a metallic sheath or strength member 11 with grounds 13 at various points along its length. It may be further assumed that there is a need for workmen to communicate between the respective locations of a Transceiver A 15 and a Transceiver B 17. In FIGS. 1 and 3 the transceivers 15, 17 are shown as being conductively coupled to the metallic sheath 11 by means of a direct connection 19, whereas in FIG. 1 they are shown as being magnetically coupled to the metallic sheath by means such as a clampable toroidal current transformer 21. Either type of coupling is satisfactory, but the magnetic type coupling is preferred. In FIGS. 1 and 2 the transceivers 15, 17 are coupled to the same cable (23 and 25, respectively). In FIG. 3 there are assumed to be multiple cables that have a common path sufficient to effect electromagnetic coupling from one cable to another due to reactive mutual impedances, so that Transceiver A 15 may be coupled to one cable 27 and Transceiver B 17 may be coupled to a different cable 31.

Figure 4:
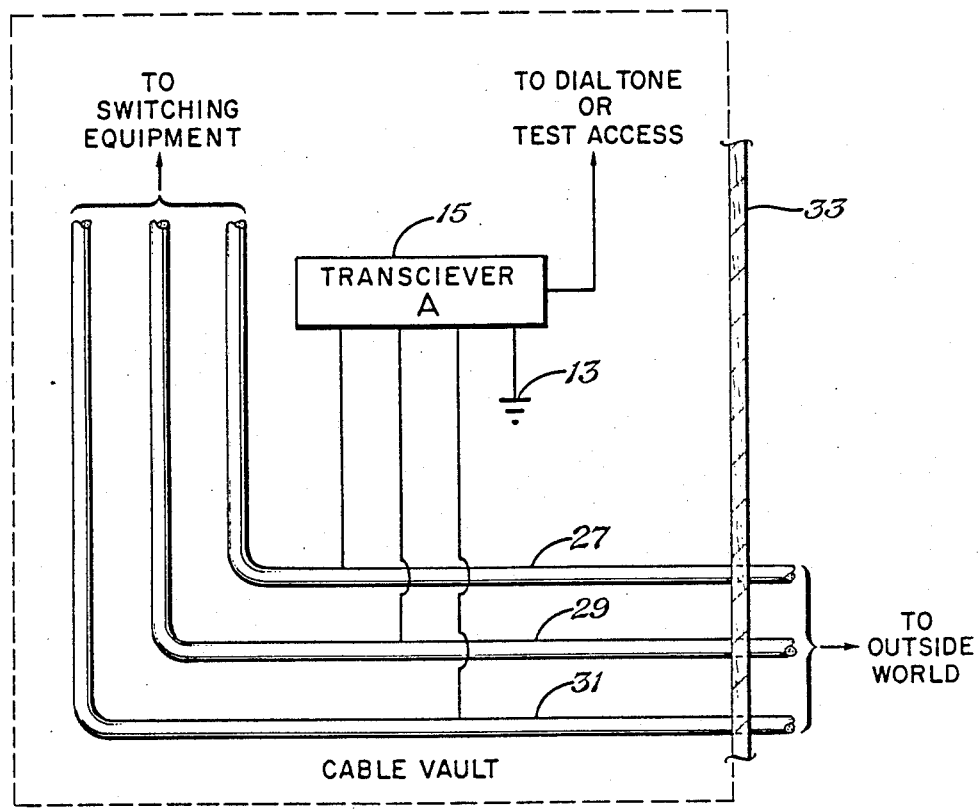
FIG. 4 is a schematic diagram illustrating a communication method in accordance with another embodiment of the invention wherein a transceiver is electrically coupled to telephone central office incoming telephone cables and provides access to a dial tone or test equipment.

In FIG. 4 it is assumed that there are multiple telephone cables 27, 29, 31 entering a cable vault 33 at a central office location and going from the cable vault to central office switching equipment. Here a Transceiver A 15 has an input-output connection coupled to each of the incoming cables, 27, 29, 31. The Transceiver A 15 may provide access either to a dial tone of the central office switching network or to a central office test network. Thus, the Transceiver A 15 located in the cable vault 33 can be connected to the switched network for making local or long distance calls and/or it can be connected to automatic test networks which can transmit voice or data test information out to the field technician. In this way the technician simply connects to any cable that is terminated in the central office and instantly receives a dial tone or access to a test network.

Transceivers to be used in the practice of the methods of the present invention can be of any suitable type that can generate a desired carrier frequency and provide for its modulation by the signal to be carried, with appropriate means for electrical coupling to the available single conductor. Carrier frequencies within the range 20 to 400 kHz. would be satisfactory, although carrier frequencies within the range of 50 to 200 kHz. are preferred.

The foregoing disclosure and the showings made in the drawings are merely illustrative of the principles of this invention and are not to be interpreted in a limiting sense.

We claim:

1. The method of communicating using a "distributed earth referenced carrier system" between a first location adjacent a single metallic conductor and a second location adjacent said single metallic conductor comprising the step of grounding said single metallic conductor for A.C. current at various points between said first and second locations.

2. The method of communicating using a "distribted earth referenced carrier system" between a first location adjacent a single metallic conductor and a second location adjacent said single metallic conductor, comprising the step of grounding said single metallic conductor for A.C. current at various points between said first and second locations; the step of coupling wherein a first transceiver electrically to said single metallic conductor at said first location; and the step of coupling a second transceiver electrically to said single metallic conductor at said second location.

3. The method of claim 2 wherein said electrical coupling is conductive.

4. The method of claim 2 wherein said electrical coupling is magnetic.

5. The method of claim 2 wherein the output or carrier frequency of said tranceivers is within the range of 20 to 400 kHz.

6. The method of claim 2 wherein the output or carrier frequency of said transceivers is within the range of 50 and 200 kHz.

7. The method of claim 2 wherein one of said transceivers is electrically coupled to a plurality of incoming cables in a telephone central office, one of which cables is the cable to which said second transceiver is electrically coupled, with said first transceiver providing access to a dial tone.

8. The method of claim 2 wherein one of said transceivers is electrically coupled to a plurality of incoming cables in a telephone central office, one of which cables is the cable to which said second transceiver is electrically coupled, with said first transceiver providing access to a test network.

9. A method of communicating using a "distributed earth referenced carrier system" between a first location adjacent a plurality of single metallic conductors that are disposed in close proximity to each other and a second location adjacent said plurality of single metallic conductors, comprising the step of grounding said single metallic conductors for A.C. current at various points between said first and second locations; the step of coupling a first transceiver electrically to one of said single metallic conductors at said first location; and the step of coupling a second transceiver electrically to another of said single metallic conductors at said second location.

* * * * *